Jan. 4, 1938.    B. G. CARLSON    2,104,582
AIRPLANE ENGINE SYNCHRONIZER
Filed Oct. 19, 1933    3 Sheets-Sheet 1
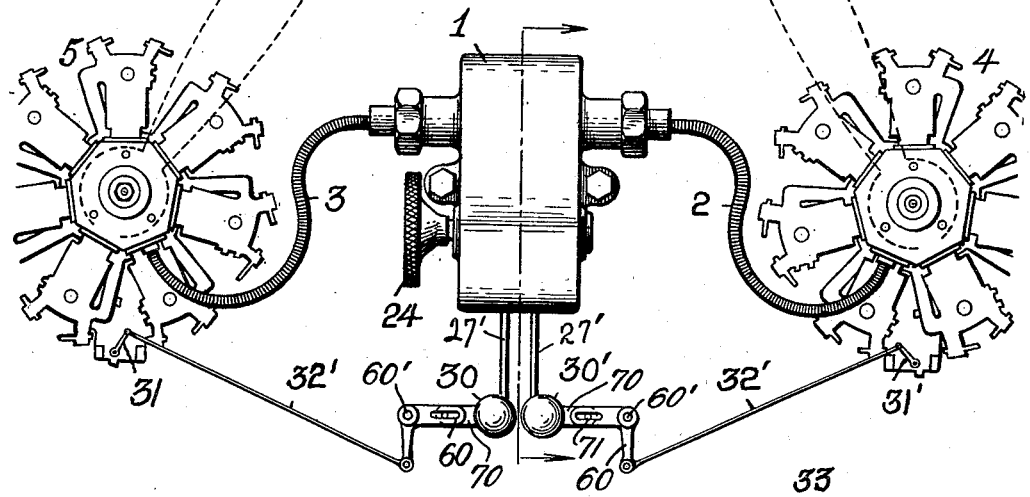
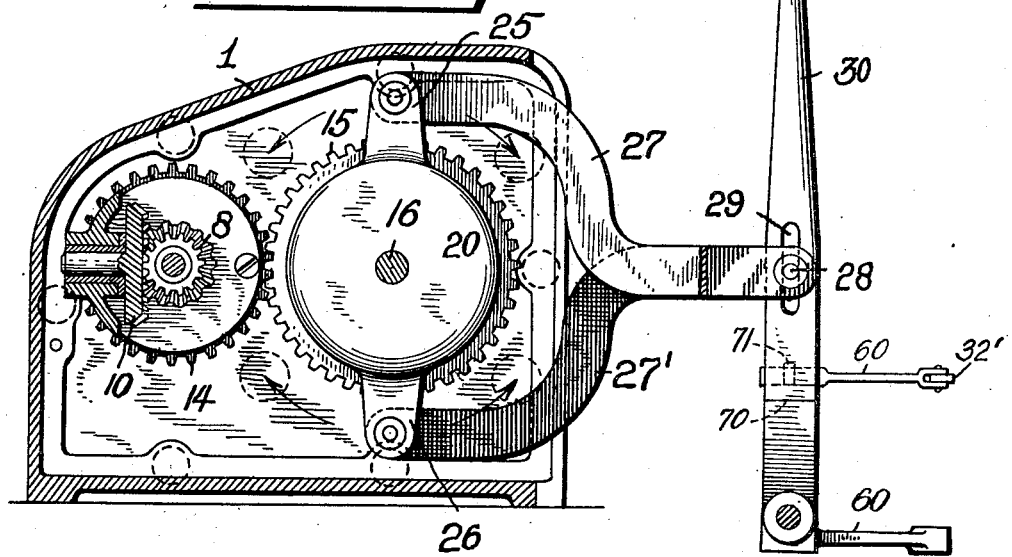
INVENTOR
BERT G. CARLSON
BY
Herbert H. Thompson
HIS ATTORNEY.

INVENTOR
BERT G. CARLSON
BY Herbert H. Thompson
HIS ATTORNEY.

Jan. 4, 1938.  B. G. CARLSON  2,104,582
AIRPLANE ENGINE SYNCHRONIZER
Filed Oct. 19, 1933   3 Sheets-Sheet 3

INVENTOR
BERT G. CARLSON
BY
Herbert H. Thompson
HIS ATTORNEY.

Patented Jan. 4, 1938

2,104,582

UNITED STATES PATENT OFFICE 2,104,582

AIRPLANE ENGINE SYNCHRONIZER

Bert G. Carlson, Queens Village, N. Y., assignor to Sperry Gyroscope Company, Inc., Brooklyn, N. Y., a corporation of New York Application October 19, 1933, Serial No. 694,352

6 Claims. (Cl. 60—97)

In reducing the noise made by aircraft engines and propellers, it has been found that disagreeable beat notes are produced in multi-engine craft when the engines are not rotated at exactly the same speed. In addition, for the best aerodynamic efficiency, engines should be kept at the same speed. My invention relates to new and improved means for equalizing or synchronizing the speeds of the several engines of a multi-engine aircraft. I am aware that it has been proposed to govern the speed of one engine in accordance with the speed of another engine, but according to my invention I prefer to employ neither engine as the measure of the proper speed but to provide a means which at all times equalizes the engine speeds by slowing down the faster and/or speeding up the slower engine.

Referring to the drawings showing several forms my invention may assume:

Fig. 1 is a diagrammatic front view of a pair of aircraft engines showing my equalizing controller applied thereto.

Fig. 2 is a sectional detail through one side of the controller box.

Figure 3:
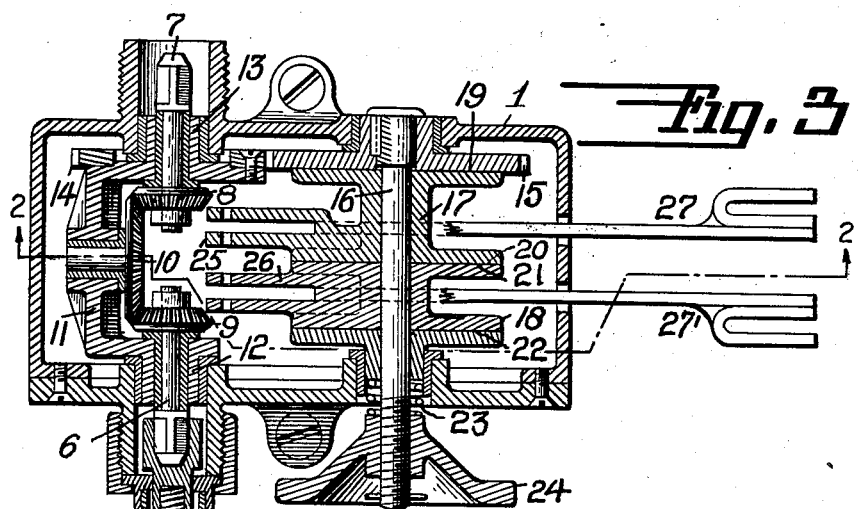
Fig. 3 is a horizontal sectional view of the same.

In Fig. 1 the engine speed controller or equalizer is shown as enclosed within the gear box 1 and is coupled as by means of flexible shafting 2 and 3 to each of the aircraft engines 4 and 5. The flexible shaft 2 is shown in Fig. 3 as driving the stub shaft 6, while a corresponding stub shaft 7 is driven from shaft 3. Each stub shaft has mounted at the inner end thereof a bevel gear 8, 9, both of which mesh with a bevel gear 10 journaled in a planetary arm 11, which in turn is mounted for rotation about the axis of the shafts 6 and 7 on sleeve bearings 12 and 13. Said planetary arm may have a spur gear 14 secured thereto which drives a gear 15 keyed to shaft 16 which is journaled in the casing 1. Loosely mounted on shaft 16 is a pair of sleeves 17 and 18 each having frictional or clutch faces 19, 20, 21 and 22 at opposite ends. Said faces are normally held together by a spring 23, the tension of which may be adjusted by adjusting the thumb piece 24 threaded on the shaft 16. When the thumb piece is retracted, the clutch sleeves are virtually loose on the shaft, but when the thumb piece is screwed inwardly, the clutch sleeves are forced upwardly in Fig. 3 so that they engage one another and face 19 engages the face of gear 15, thus coupling the sleeve to the shaft.

Each sleeve 17 and 18 has an ear 25, 26, respectively, extending therefrom to which are pinned goose necked arms 27 and 27', respectively. Each arm at its outer end is shown as having a pin 28 through the forked end thereof which engages a slot 29 in each of throttle operating levers 30 and 30', said levers being connected, respectively, to the throttles 31, 31' of the engines 5 and 4 through rods 32 and 32' and bell-crank levers 60 pivoted on fixed pivots 60'. Levers 30 and 30' are shown provided with transverse lugs or projections 70 carrying pins 71 that engage in slots provided in bell crank levers 60, for effecting the turning of these levers and hence the actuation of rods 32, 32' and throttles 31, 31'. Each lever 30 and 30' is also preferably provided with a knob 33 for direct hand control of each throttle, so that the automatic regulator may be over-powered at any time and the throttle controlled directly, the friction clutches always permitting a manual over-control.

Figure 4:
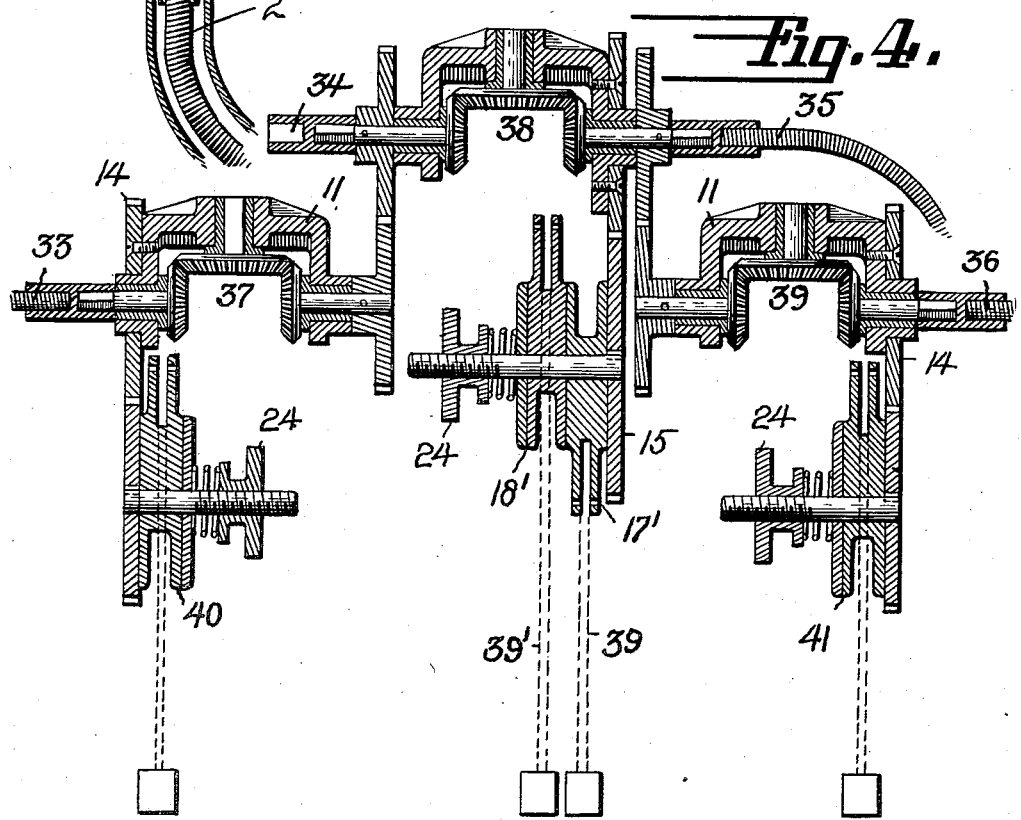
Fig. 4 is a similar sectional view of a modification showing how my invention may be applied to a four engine craft.

The same principle is shown as applied to a four engine aircraft in Fig. 4. In this figure the speed of the four engines is transmitted severally through shafts 33, 34, 35 and 36 and three differential units are employed 37, 38 and 39. Differential 38 is placed between shafts 34 and 35 and operates in the same manner as the differential in Fig. 3 to drive the two clutches 17' and 18' and the corresponding levers 39 and 39' which may be connected to the throttles as in Fig. 1. Differential 37 on the other hand is placed between shafts 33 and 34, the planetary arm driving the friction clutch 40, while the differential 39 is placed between shafts 36 and 35, the differential arm driving the clutch 41. By this mechanism the speed of each engine is compared and averaged with the speed of another engine so that the same result is secured as in Fig. 3.

Figure 5:
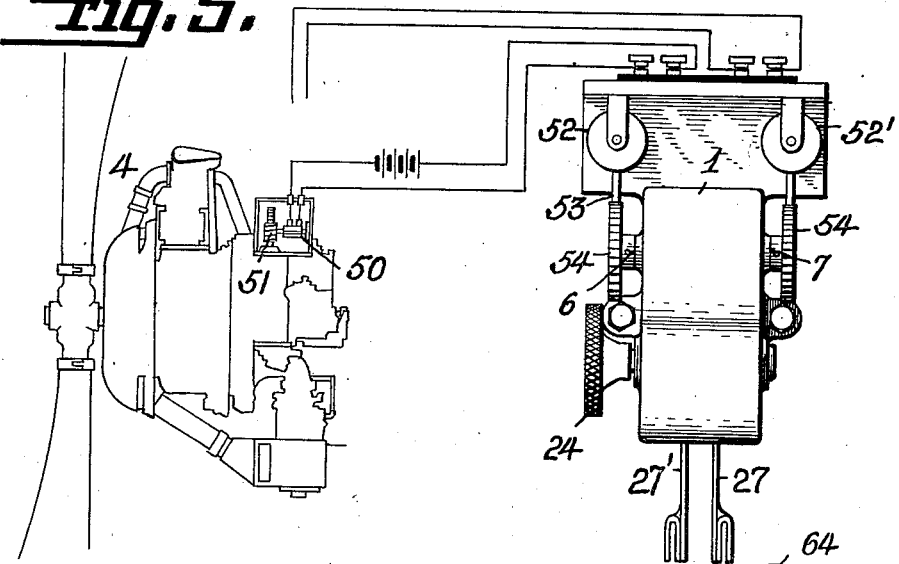
Fig. 5 shows another modification employing an electrical transmission between the engine and controller instead of the flexible shaft shown in the other figures.
Figure 6:
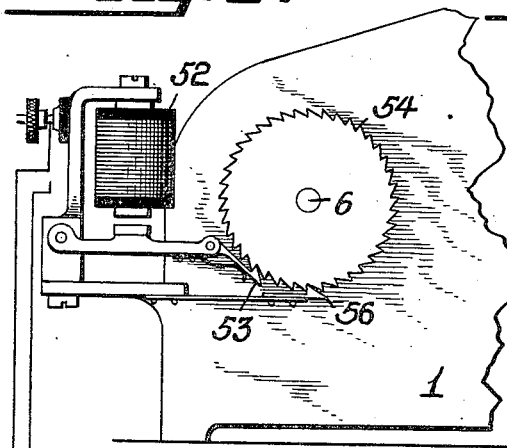
Fig. 6 is a detail of the electrically operated pawl and ratchet for turning the controller.

In Figs. 5 and 6 is shown an electrical means for transmitting the engine's speed to the differential mechanism so as to avoid the use of long, heavy flexible shafts. According to this form of the invention an electrical contactor or single bar commutator 50 is driven from each engine as by means of a worm and worm shaft connection 51. Each contactor is placed in circuit with an electro-magnet 52 (or 52') which operates a pawl 53 to move the ratchet wheel 54 through a notch upon each excitation. The ratchet wheels actuate respectively the shafts 6 and 7 of the differential mechanism of Fig. 3. A locking pawl 56 may be used to prevent backward turning of the ratchet wheel as the pawl 53 is reciprocated. It will be understood that the electrical system shown is merely illustrative of any one of a number of electrical remote control devices which may be used to operate the differential mechanism at a distance from the aircraft engines.

Figure 7:
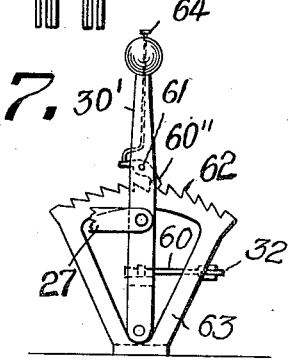
Fig. 7 is a detail of a modification for preventing possible stalling of both engines in case one engine stalls.

It will, of course, be understood that in case one of the engines stalls, the pilot, by grasping the control knob 33 of the other engine, can prevent the slowing down of the other engine and in fact speed it up. An automatic means for preventing possible stalling of one engine by the stalling of another is shown in Fig. 7. In this instance each of the control levers, such as lever 30', to which the automatic regulator is connected through lever 27', is provided with a pawl 60'' pivoted at 61 and yieldingly engaging coarse ratchet teeth 62 on the guide bracket 63. Said pawl and ratchet are designed to prevent a substantial backward movement of either lever 30' so as to prevent slowing down of the engine by the automatic mechanism. The teeth are preferably made coarse so that a limited amount of variation of engine speed may take place to keep the engines at the same speed and to maintain the proper air speed. However, if one engine is missing or stalls, the pawl and ratchet will prevent the other engine from being materially effected. The operator may at any time release the pawl by pressing button 64 so as to control the engine speed at will.

Figure 8:
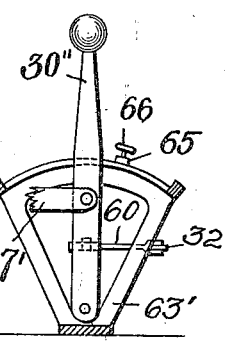
Fig. 8 is a corresponding detail of a second modification for the same purpose.
Figure 9:
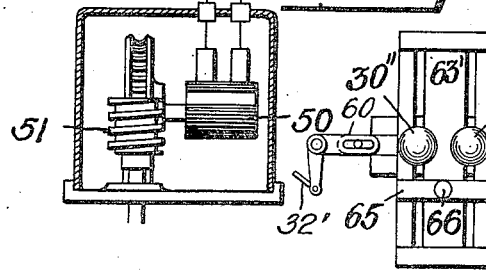
Fig. 9 is a plan view of the same.

A similar result is secured by the adjustable stop 65 shown in Figs. 8 and 9. Said stop may be clamped at any point on the guide bracket 63' by thumb screw 66 so as to prevent either lever 30 or 30' from being moved back far enough by the automatic means to stall the engine or to seriously reduce air speed. It will be understood that when either the stop 65 or the pawl and ratchet in Fig. 7 is in operation, the clutch 17 or 18 connected to the faster engine slips by reason of the positive stop action of the stop so that the slower engine is speeded up without greatly reducing the speed of the faster engine.

From the foregoing, the operation of my invention will be readily understood and its advantages over the systems heretofore proposed appreciated. If one engine is taken as a measure of the speed of the other engine or engines, it is difficult to bring the plane to the proper air speed. For instance, the pilot in starting a flight will quickly bring his throttles to positions so that the proper air speed is reached and then the automatic synchronizing arrangement is thrown in. With my invention, the same air speed will be maintained after the engine speeds are synchronized because the engine speeds are averaged while with the prior systems the air speed will rise or fall as the other engines are brought up to speed of the master engine, depending on whether the master engine speed is greater or less than that of the other engine (or engines) when the automatic synchronizer becomes effective.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with the multi-engines of an aircraft, of synchronizing mechanism comprising an electrical transmitter driven by each engine, receiving means driven by each transmitter, differential means actuated by said receiving means, motion transmitting means, a plurality of engine throttles differentially actuated from said differential means through said motion transmitting means to speed up a slower and retard a faster engine and means providing for simultaneous manual operation of said engine throttles, said synchronizing mechanism serving, upon the manual operation of any one of said throttles, to effect a corresponding operation of the remaining throttles.

2. The combination with the multi-engines of an aircraft, of an electrical transmitter driven by each, receiving means driven by each transmitter, differential means actuated by said receiving means, and means actuated thereby for turning the throttle of at least the slower engine to accelerate the same and manually operable means for limiting such turning movement.

3. In an aircraft multi-engine synchronizer, the combination with a throttle for each engine, means driven in accordance with the speed of each engine, differential means actuated upon a difference in speed of said first means, a plurality of means actuated thereby for advancing the throttle of the slower and retarding the throttle of the faster engine, and means limiting movement of the engine throttles for preventing the faster engine from being stopped in case the other engine stalls.

4. In an aircraft multi-engine synchronizer, the combination with a throttle for each engine, means driven in accordance with the speed of each engine, differential means actuated upon a difference in speed of said first means, means actuated thereby for advancing the throttle of the slower engine, and means associated with the manual operation of said throttles for preventing more than a predetermined retarding of the throttle of the faster engine.

5. In an aircraft multi-engine synchronizer, the combination with a throttle for each engine, means driven in accordance with the speed of each engine, differential gearing actuated upon a difference in speed of said first means, a plurality of motion transmitting means actuated from said differential gearing for advancing the throttle of the slower and retarding the throttle of the faster engines, and manually operable means connected to said motion transmitting means for operating any throttle direct regardless of said first means and without disconnecting the drive from said differential gearing to said plurality of motion transmitting means, said synchronizer acting, upon the manual operation of the throttle of one of said engines, to effect a corresponding operation of the throttles of the others of said engines.

6. In an aircraft multi-engine synchronizer, the combination with a throttle for each engine, means driven in accordance with the speed of each engine, differential gearing actuated upon a difference in speed of said first means, a plurality of motion transmitting means actuated from said differential gearing for advancing the throttle of the slower and retarding the throttle of the faster engines, manually operable means connected to said motion transmitting means for operating any throttle direct regardless of said first means and without disconnecting the drive from said differential gearing to said plurality of motion transmitting means, said synchronizer acting, upon the manual operation of the throttle of one of said engines, to effect a corresponding operation of the throttles of the others of said engines, and additional manually operable means for limiting the operating movement of the engine throttles.

BERT G. CARLSON.